United States Patent
Hughes

(10) Patent No.: US 8,447,165 B1
(45) Date of Patent: May 21, 2013

(54) SUMMARIZING VIDEO DATA

(75) Inventor: Joseph Hughes, London (GB)

(73) Assignee: Google Inc., Mountain View, CA (US)

( * ) Notice: Subject to any disclaimer, the term of this patent is extended or adjusted under 35 U.S.C. 154(b) by 99 days.

(21) Appl. No.: 13/214,800

(22) Filed: Aug. 22, 2011

(51) Int. Cl.
*H04N 9/80* (2006.01)
*H04N 5/92* (2006.01)

(52) U.S. Cl.
USPC .......................................... 386/241; 386/244

(58) Field of Classification Search
USPC .................. 386/241, 244, 245, 246, 248, 278
See application file for complete search history.

(56) References Cited

U.S. PATENT DOCUMENTS

| 5,900,908 A | * | 5/1999 | Kirkland | 348/62 |
| 6,754,631 B1 | * | 6/2004 | Din | 704/270 |
| 7,222,300 B2 | | 5/2007 | Toyama et al. | |
| 2008/0158334 A1 | | 7/2008 | Reponen et al. | |

* cited by examiner

*Primary Examiner* — Robert Chevalier
(74) *Attorney, Agent, or Firm* — Young Basile Hanlon & MacFarlane P.C.

(57) ABSTRACT

Systems, methods, and apparatuses for summarizing contents of video data are disclosed. The method includes identifying at least one utterance in the video data, generating text for each utterance identified, associating a plurality of source frames with each utterance identified, identifying one or more candidate frames in the plurality of source frames, selecting a summary frame from the one or more candidate frames, and associating the text with the summary frame. In a preferred embodiment, the method also includes generating a bubble including the text generated and positioning the bubble on the summary frame.

20 Claims, 3 Drawing Sheets

SUMMARIZING VIDEO DATA

TECHNICAL FIELD

The present invention relates in general to summarizing the contents of video data for representation in summary format.

BACKGROUND

Video data is readily available to viewers in formats such as television shows and movies. This video data can, for example, be recorded for later viewing on digital video recorders (DVRs) or accessed directly for viewing through various websites in the case that a viewer is unable to view a television show or movie during its original air time, or the viewer would like to record or access the show or movie at a later time. Viewers can access video data using their televisions, computers, or mobile devices such as phones or tablets. With the abundance of television shows and movies that viewers can record or access for later viewing, the viewer may be unable to watch all of their recorded video data or be too busy to access websites allowing them to review previously aired video data.

SUMMARY

Disclosed herein are embodiments of systems, methods, and apparatuses for summarizing the contents of video data.

In accordance with one aspect of the disclosed embodiments, a method for summarizing contents of video data having a plurality of frames includes identifying at least one utterance in the video data and generating text for each utterance identified. The method also includes associating a plurality of source frames with each utterance identified, identifying one or more candidate frames in the plurality of source frames, and selecting a summary frame from the one or more candidate frames. Further, the method includes associating the text with the summary frame.

In accordance with another aspect of the disclosed embodiments, an apparatus for summarizing contents of video data having a plurality of frames includes a memory and a processor configured to execute instructions stored in the memory to identify at least one utterance in the video data. The processor is also configured to generate text for each utterance identified, associate a plurality of source frames with each utterance identified, and identify one or more candidate frames in the plurality of source frames. Further, the processor is configured to select a summary frame from the one or more candidate frames and associate the text with the summary frame.

In accordance with yet another aspect of the disclosed embodiments, a system for summarizing contents of video data includes a provider device with a processor for controlling the operations of the provider device and a memory for storing data and program instructions used by the processor. The system further includes a network including means of transferring data to and from the provider device.

In accordance with yet another aspect of the disclosed embodiments, a user device for summarizing contents of video data includes a processor for controlling the operations of the user device and a memory for storing data and program instructions used by the processor. The user device further includes a display configured to present at least one summary frame of video data.

These and other embodiments will be described in additional detail hereinafter.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
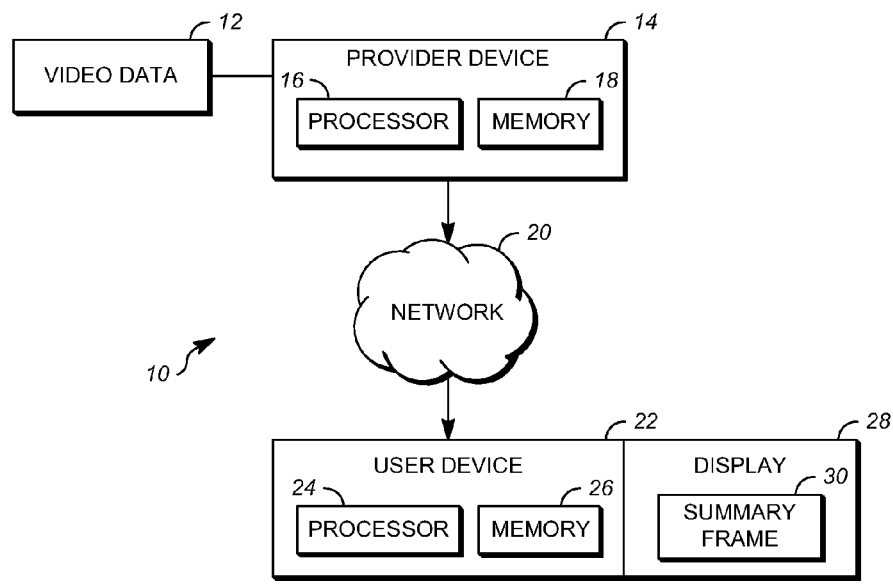
FIG. 1 is a block diagram of a video data summary system in accordance with one embodiment.

FIG. 1 is a block diagram of a video data summary system 10 for summarizing the contents of video data 12. The video data summary system 10 can include a provider device 14, a network 20, and a user device 22. In this embodiment, the provider device 14 summarizes video data 12 from various sources including television shows, movies, or other video content. The summarized video data is then transferred over the network 20 to a user device 22. The summarized video data can be reviewed on the user device 22 in a shorter period of time than it would take to watch the source television show, movie, or other video content.

A provider device 14 can be, for example, a computer having an internal configuration of hardware including a processor such as a central processing unit (CPU) 16 and a memory 18. The CPU 16 can be a controller for controlling the operations of the provider device 14. The CPU 16 is connected to the memory 18 by, for example, a memory bus. The memory 18 can be random access memory (RAM) or any other suitable memory device. The memory 18 can store data and program instructions which are used by the CPU 16. Other suitable implementations of the provider device 14 are also possible. For example, the processing of the provider device 14 can be distributed among multiple devices.

The network 20 connects the provider device 14 and the user device 22 for transferring data between the provider device 14 and user device 22. The network 20 can, for example, be the Internet. The network 20 can also be a local area network (LAN), wide area network (WAN), virtual private network (VPN), wireless local area network such as one based on the IEEE 802.11 standards, or any other means of transferring the video data 12 from the provider device 14 to the user device 22.

In one example, the user device 22 is a mobile telephone. In other examples, the user device 22 can be a personal computer, tablet, or television. The user device 22 includes a processor such as a central processing unit (CPU) 24, a memory 26, and a display 28. The CPU 24 is a controller for controlling the operations of the user device 22. The CPU 24 can be connected to the memory 26 by, for example, a memory bus. The memory 26 can be RAM or any other suitable memory device. The memory 26 stores data and program instructions which are used by the CPU 24. Other suitable implementations of the user device 22 are possible. For example, the processing of the user device 22 can be distributed among multiple devices.

The display 28 is configured to present the summarized video data on the user device 22 in the form of at least one summary frame 30. In one embodiment, the display 28 can be integral with the device 22. In an alternate embodiment, the display can be separated from and connected to the user device 22 via a wired or wireless coupling such as a USB cable or a Bluetooth-enabled wireless connection. The display 28 can be implemented in various ways, including by a liquid crystal display (LCD) or a cathode-ray tube (CRT).

Other implementations of the video data summary system 10 are also possible. For example, one implementation can omit the provider device 14 and the network 20. In this implementation, the video data 12 is summarized by the user device 22 into the at least one summary frame 30 for viewing on the display 28. In another implementation, the at least one summary frame 30 of summarized video data can be stored on the network 20 for transmission at a later time to the user device 22 or any other device with access to the network 20.

Figure 2:
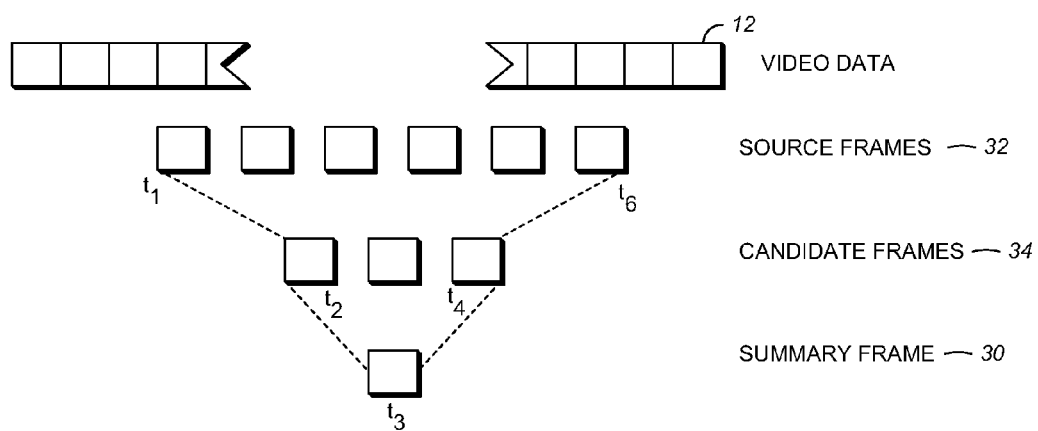
FIG. 2 is a schematic diagram of video data that can be summarized by system of FIG. 1.

FIG. 2 shows the physical progression of video data 12 as it is summarized by the video data summary system 10 of FIG. 1. The video data 12 can initially include a time sequence of frames identified in the format $t_k$, where t represents time and k represents the frame number in the time sequence. For example, video data 12 can include frames $t_1$ to $t_{1000}$. This time sequence can be the complete set of frames in a television show or movie containing characters making utterances that advance the plot of the television show or movie throughout the sequence of frames. FIG. 2 gives a simple example showing six adjacent source frames 32, frames $t_1$ to $t_6$, which make up a part of the full time sequence of video data 12. Once source frames 32 are identified, a narrower time sequence of adjacent candidate frames 34 is selected from the source frames 32, for example, $t_2$ to $t_4$. The candidate frames 34 can be selected based on the presence of characters, the utterances made by the characters, or how well the utterances advance the plot of the television show, movie, or other video content. Other suitable techniques for selecting candidate frames 34 are also possible.

Finally, a single summary frame 30 is selected from the candidate frames 34 for presentation by the display 28 of FIG. 1, for example, $t_3$. This summary frame 30 can be selected from the candidate frames 34 based on the visual appearance of the character making the utterance in the candidate frames 34. Further, more than one summary frame 30 can be selected from a source of video data 12. When multiple summary frames 30 are selected, the selection of the summary frames 30 can be periodic, i.e. based on time increments within the video data 12, random, or based on other factors. For example, a source of video data 12 with a time sequence of frames $t_1$ to $t_{1000}$ can be summarized with selected summary frames 30 at $t_3$, $t_{218}$, $t_{540}$, $t_{822}$, and $t_{977}$. The multiple summary frames 30 can then be viewed together to summarize the plot of television show, movie, or other video content in a limited number of frames.

Figure 3:
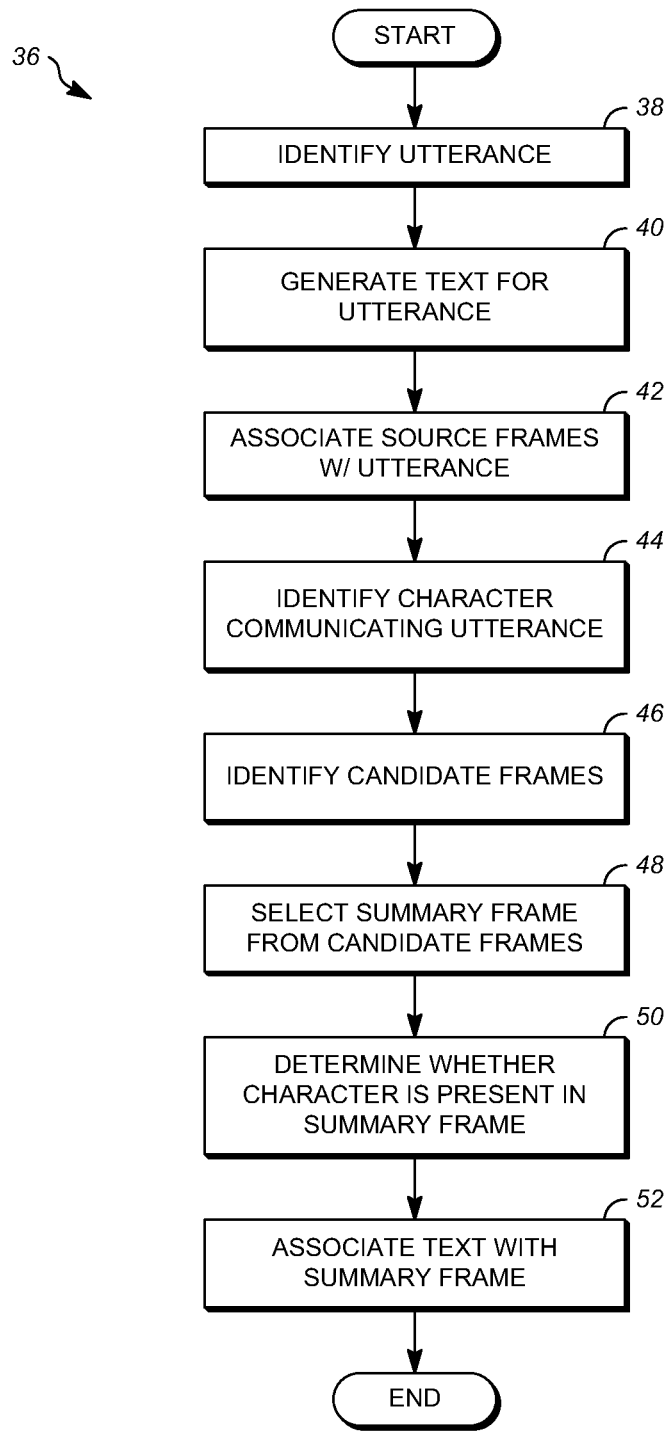
FIG. 3 is a flowchart of an exemplary process of summarizing video data in the system of FIG. 1.

FIG. 3 is a flowchart of an exemplary summary process 36 of summarizing video data 12 as implemented in the video data summary system 10 of FIG. 1. Beginning at step 38, at least one utterance is identified in the video data 12. The utterance can include words or other sounds present in the video data 12 and is not limited to speech. For example, video data 12 can be pulled from a television show, movie, or other video content and the utterance identified can be part of a speech made by a character, or a dog barking, or an explosion occurring. Other suitable utterances can also be identified in the video data 12. The utterance may be chosen based on its importance, for example, in furthering the plot of a television show, movie, or other video content. In another example, all utterances can be used from the source of video data 12 In the example of summarizing video data 12 from a television show, movie, or other video content, multiple utterances can be identified that, when put together, can summarize at least some as the plot of the television show, movie, or other video content which is the source of the video data 12.

In step 40, text is generated for each utterance identified. In other words, a textual representation of the contents of the utterance will be produced for each utterance. For example, the sound of a dog barking loudly can be textually represented by "Dog barks loudly" or "Woof." In another example, a long speech given by a character about the problems she has with her mother-in-law can be textually represented by a direct quote from one short piece of her speech: "My mother-in-law is too stubborn." The textual representation can also be a summary of a character's speech instead of a direct quotation. In another example, the sound of an explosion occurring can be textually represented by "Kaboom."

In step 42, each utterance identified is associated with a plurality of source frames 32. A given utterance will occur within a specific time sequence of source frames 32. Each utterance identified may be present in a different time sequence of source frames 32. For example, if the barking dog, complaining daughter-in-law, and explosion are key pieces of the plot of a television show, movie, or other source of video content, the time sequence of frames when the dog barks, the daughter-in-law complains about her mother-in-law, and explosion occurs will be identified as source frames 32. If, for example, a dog is barking in reference frames $t_1$ to $t_6$ from FIG. 2, the textual representation of the utterance "dog barks loudly" can be associated with the frames $t_1$ to $t_6$ as source frames 32 for that utterance.

In step 44, the character communicating the utterance associated with the source frames 32 is identified. One way in which this identification can be made is by using a voice recognition program. The voices of characters present in the video data 12 are compared with samples of many characters' voices. For example, a character can be identified by reviewing a cast member list for a television show, movie, or other video content and comparing past audio samples from the cast members on that list with the audio data in the television show, movie, or other video content being summarized.

An additional way to identify the character communicating the utterance can be, for example, through a review of closed captioning text associated with the video data 12 being summarized. In a first example, the closed captioning text can directly identify the name of each character before listing the utterance made by the character in a given source of video data 12 such as a television show, movie, or other video content. The name in the closed captioning text can be used to identify the character. In a second example, some closed captioning programs position text near the character making the utterance. In this example, the position of the closed captioning text can be used to identify the character. In a third example, some closed captioning programs use different colors of text for different characters. In this example, the color of the closed captioning text can be used to identify the character.

Another way to identify the character communicating the utterance can be, for example, through a review of the source frames 32 using a face recognition program. The face recognition program can compare the face of the character in the video data 12 being summarized with a reference library of identified faces where a match between the video data 12 and the reference library can allow identification of the character. The face recognition program can also be capable of identifying whether characters are making utterances by detecting if the lips of the character are moving in the source frames 32.

In step 46, one or more candidate frames 34 are identified from the plurality of source frames 32. One way to identify the candidate frames 34 can be based on the presence of the face of the character communicating the utterance. The face recognition program, as described above, can allow identification of specific characters by comparing the video data 12 being summarized with a reference library of identified faces. For example, candidate frames 34 can be selected that include the face of the complaining daughter-in-law from the source frames 32 that include the entire speech given by the daughter-in-law about the problems she has with her mother-in-law. The face recognition program can be further used to identify candidate frames by identifying whether characters are speaking, i.e. their lips are moving, when the face of the character is identified in the source frame 32.

Another way to identify the candidate frames 34 from the source frames 32 can be to identify the candidate frames 34 based on the presence of an important event generating the utterance. For example, the utterance can be based on the barking dog or the sound of an explosion. In that case, the candidate frames 34 can be selected to include a representation of the dog or a representation of the explosion, such as bombs, fire, and debris.

In step 48, a summary frame 30 is selected from the one or more candidate frames 34. Selection of the summary frame 30 can be based on ranking the one or more candidate frames 34 by visual appearance of the face of the character detected in the one of more candidate frames 34. The character detected in the candidate frames 34 can be identified as the character communicating the utterance to be summarized in the text generated. The top-ranked candidate frame 34, in terms of visual appearance of the face of character communicating the utterance, can be selected as the summary frame 30. For example, the daughter-in-law complaining about her mother-in-law may appear in several candidate frames 34, but her face may be partially obstructed in some candidate frames 34, she may have strange facial expressions in other candidate frames 34, and only one of the candidate frames 34 may show her entire face with a pleasing expression. The candidate frame 34 with the pleasing expression can be selected as the summary frame 30.

Selection of the summary frame 30 can also be based on the visual appearance of an important event generating the utterance. For example, a dog may appear in profile in some of the candidate frames 34 to represent the barking dog, and a large fire may appear in other candidate frames 34 to represent the explosion. It should also be understood that it is not necessary to select a summary frame 30 based on the visual appearance of the face of a character communicating an utterance or an important event generating the utterance. It is possible that a summary frame 30 would not include characters or events.

In step 50, the summary frame 30 is reviewed to determine whether the character communicating the utterance is present. For example, a summary frame 30 may have been selected showing the face of the daughter-in-law complaining about her mother-in-law. It is also possible that other characters besides the character communicating the utterance are present in the summary frame 30. For example, the daughter-in-law may be complaining to her husband, who is also shown in the summary frame 30. As indicated above, the summary frame 30 may not include the character communicating the utterance. For example, a summary frame 30 may have been selected showing a large fire representing the explosion.

In step 52, the text generated for each utterance is associated with the summary frame 30 selected for each utterance. In one embodiment, this can include appending the text to the summary frame 30 for use at a later time. For example, the provider device 14 can store the summary frame 30 and text generated for the utterance associated with the summary frame 30 separately so that the user device 22 could access the summary frame 30 and text generated for the utterance associated with the summary frame 30 at a later time.

In another embodiment, the text being associated with the summary frame 30 can include generating and positioning a bubble 54 on the summary frame 30, i.e. superimposing the bubble 54 on the summary frame 30. The bubble 54 can include the text generated for the utterance and be positioned on the summary frame 30. If the character communicating the utterance is present in the summary frame 30, a portion of the bubble 54 can be placed in close proximity to the character in the summary frame 30. If the character communicating the utterance is not present in the summary frame 30, the bubble 54 can be placed at a predetermined location on the summary frame 30. Examples of positioning different types of bubbles 54, 58 on different summary frames 30, 56 are shown in FIGS. 4 and 5.

Figure 4:
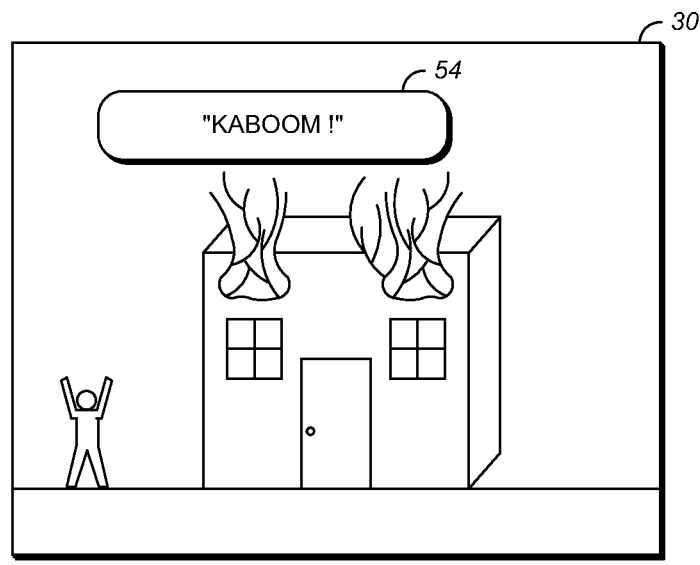
FIG. 4 is a schematic diagram of an exemplary summary frame generated using the process of FIG. 3.

FIG. 4 is an example summary frame 30 where a character is not communicating the utterance associated with the summary frame 30. For example, the utterance is the sound of an explosion occurring in a television show, movie, or other video content. The text generated to represent the utterance is "Kaboom." The placement of the bubble 54 containing "Kaboom" is not tied to any object or character in the summary frame 30, but is instead placed at a predetermined location near the top of the summary frame 30.

Figure 5:
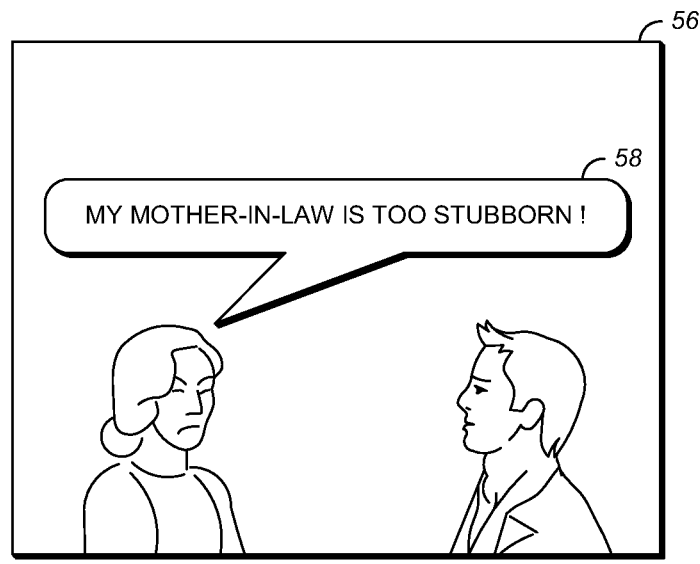
FIG. 5 is a schematic diagram of another exemplary summary frame generated using the process of FIG. 3.

FIG. 5 is another example summary frame 56 where one character present in the frame is communicating the utterance associated with the summary frame 56. For example, the utterance can be the speech given by the daughter-in-law about the problems she has with her mother-in-law. The utterance is textually represented by one short piece of her speech: "My mother-in-law is too stubborn." The example bubble 58 can include this textual representation with a portion of the bubble 58 in close proximity to the face of the daughter-in-law to indicate that the utterance can be attributed to her. In this example, another character is also located in the summary frame 56, the daughter-in-law's husband, who is not contributing to the utterance.

Additional embodiments can include multiple bubbles each associated with different characters communicating different utterances. The bubbles can be further distinguished in shape or color to allow visual association of the bubble with the character communicating the utterance.

In summary, the system and method for summarizing the contents of video data includes starting with a given source of video data 12, for example, a television show, and summarizing the video data 12 by selecting multiple summary frames 30, 56. Then, bubbles 54, 58 can be positioned on each of the summary frames 30 to communicate character and non-character utterances the further the plot of the television show. These summary frames 30, 56 with bubbles 54, 58 can be combined together in a format similar to a comic book, available in print or electronic form. This summarized television show can allow a television viewer to catch up with missed episodes without spending the time needed to watch the episodes.

The embodiments of the provider device 14 and the user device 22 (and the algorithms, methods, instructions, etc. stored thereon and executed thereby) can be realized in hardware including, for example, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing, either singly or in combination. Further, portions of the provider device 14 and the user device 22 do not necessarily have to be implemented in the same manner.

Further, in one embodiment, for example, the provider device 14 or the user device 22 can be implemented using a general purpose computer/processor with a computer program that, when executed, carries out any of the respective methods, algorithms, or instructions described herein. In addition or alternatively, for example, a special purpose computer/processor can be utilized which can contain specialized hardware for carrying out any of the methods, algorithms, or instructions described herein.

Further, all or a portion of embodiments of the present invention can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for summarizing contents of video data having a plurality of frames, comprising:
    identifying at least one utterance in the video data;
    generating text for each utterance identified;
    associating a plurality of source frames with each utterance identified;
    identifying one or more candidate frames in the plurality of source frames;
    selecting a summary frame from the one or more candidate frames; and
    and associating the text with the summary frame.

2. The method of claim 1, wherein associating the text with the summary frame includes:
    appending the text to the summary frame.

3. The method of claim 1, wherein associating the text with the summary frame includes:
    generating a bubble, wherein the bubble includes the text generated, and
    positioning the bubble on the summary frame.

4. The method of claim 3, further comprising identifying a character communicating the at least one utterance.

5. The method of claim 4, wherein selecting a summary frame comprises:
    detecting a face of the character communicating the at least one utterance in the one or more candidate frames;
    ranking the one or more candidate frames based on a visual appearance of the face detected in the one or more candidate frames; and
    selecting the top-ranked candidate frame as the summary frame.

6. The method of claim 4, further comprising determining whether the character is present in the summary frame.

7. The method of claim 6, wherein positioning the bubble includes placing the bubble at a predetermined location on the summary frame if the character is not present in the summary frame.

8. The method of claim 6, wherein positioning the bubble includes placing the bubble at a location in close proximity to the character on the summary frame if the character is present in the summary frame.

9. An apparatus for summarizing contents of video data having a plurality of frames, comprising:
    a memory;
    a processor configured to execute instructions stored in the memory to:
    identify at least one utterance in the video data;
    generate text for each utterance identified;
    associate a plurality of source frames with each utterance identified;
    identify one or more candidate frames in the plurality of source frames;
    select a summary frame from the one or more candidate frames; and
    associate the text with the summary frame.

10. The apparatus of claim 9, wherein the processor is further configured to execute instructions stored in the memory to:
    generate a bubble, wherein the bubble includes the text associated with the summary frame; and
    position the bubble on the summary frame.

11. The apparatus of claim 10, wherein the processor is further configured to execute instructions stored in the memory to:
    identify a character communicating the at least one utterance.

12. The apparatus of claim 11, wherein the processor is further configured to execute instructions stored in the memory to:
    detect a face of the character communicating the at least one utterance in the one or more candidate frames;
    rank the one or more candidate frames based on a visual appearance of the face detected in the one or more candidate frames; and
    select the top-ranked candidate frame as the summary frame.

13. The apparatus of claim 11, wherein the processor is further configured to execute instructions stored in the memory to:
    determine whether the character is present in the summary frame.

14. The apparatus of claim 13, wherein the processor is further configured to execute instructions stored in the memory to:
    place the bubble at a predetermined location on the summary frame if the character is not present in the summary frame; and
    place the bubble at a location in close proximity to the character on the summary frame if the character is present in the summary frame.

15. A system for summarizing contents of video data comprising:
    a network;
    a provider device in communication with the network and including:
    a processor for controlling the operations of the provider device; and
    a memory for storing data and program instructions used by the processor wherein the processor is configured to execute instructions stored in the memory to:
    identify at least one utterance in the video data;
    generate text for each utterance identified;
    associate a plurality of source frames with each utterance identified;

identify one or more candidate frames in the plurality of source frames;
select a summary frame from the one or more candidate frames; and
associate the text with the summary frame; and
a user device in communication with the network and configured to receive and display the summary frame.

16. The system of claim 15, wherein the processor is further configured to execute instructions stored in the memory to:
generate a bubble, wherein the bubble includes the text associated with the summary frame; and
position the bubble on the summary frame.

17. The system of claim 16, wherein the processor is further configured to execute instructions stored in the memory to:
identify a character communicating the at least one utterance;
determine whether the character is present in the summary frame;
place the bubble at a predetermined location on the summary frame if the character is not present in the summary frame; and
place the bubble at a location in close proximity to the character on the summary frame if the character is present in the summary frame.

18. A user device for summarizing contents of video data, comprising:
a processor for controlling the operations of the user device;
a memory for storing data and program instructions used by the processor wherein the processor is configured to execute instructions stored in the memory to:
identify at least one utterance in the video data;
generate text for each utterance identified;
associate a plurality of source frames with each utterance identified;
identify one or more candidate frames in the plurality of source frames;
select a summary frame from the one or more candidate frames; and
associate the text with the summary frame; and
a display configured to present at least one summary frame of video data.

19. The user device of claim 18, further comprising a network comprising means of transferring the summary frame of video data to the user device.

20. The user device of claim 18, wherein the processor is further configured to execute instructions stored in the memory to:
generate a bubble, wherein the bubble includes the text associated with the summary frame; and
position the bubble on the summary frame.

* * * * *